United States Patent
Tang (10) Patent No.: US 10,298,495 B2
(45) Date of Patent: May 21, 2019

(54) PACKET FORWARDING METHOD AND APPARATUS

(71) Applicant: Huawei Technologies Co., Ltd., Shenzhen (CN)

(72) Inventor: Cheng Tang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 15/639,748

(22) Filed: Jun. 30, 2017

(65) Prior Publication Data

US 2017/0302574 A1    Oct. 19, 2017

Related U.S. Application Data

(63) Continuation of application No. PCT/CN2015/096467, filed on Dec. 4, 2015.

(30) Foreign Application Priority Data

Dec. 30, 2014    (CN) .......................... 2014 1 0853247

(51) Int. Cl.
*H04L 12/741*    (2013.01)
*H04L 12/873*    (2013.01)
(Continued)

(52) U.S. Cl.
CPC ............ *H04L 45/74* (2013.01); *H04L 47/522* (2013.01); *H04L 47/62* (2013.01); *H04L 49/508* (2013.01); *H04L 49/3045* (2013.01)

(58) Field of Classification Search
CPC ....... H04L 45/74; H04L 49/508; H04L 47/62; H04L 47/522; H04L 49/3045
See application file for complete search history.

(56) References Cited

U.S. PATENT DOCUMENTS

2002/0154649 A1    10/2002    Takase et al.
2003/0128712 A1    7/2003    Moriwaki et al.
(Continued)

FOREIGN PATENT DOCUMENTS

CN    1960334 A    5/2007
CN    1968186 A    5/2007
(Continued)

OTHER PUBLICATIONS

Machine Translation and Abstract of Chinese Publication No. CN1960334, May 9, 2007, 9 pages.
(Continued)

*Primary Examiner* — Walli Z Butt
(74) *Attorney, Agent, or Firm* — Conley Rose, P.C.

(57) ABSTRACT

Embodiments of the present invention disclose a packet forwarding method and apparatus. The method includes: receiving, by a first scheduler, a target packet; sending the target packet to a destination physical egress port corresponding to the egress port information, and increasing, according to the queue identifier, a queue length of a virtual queue corresponding to the queue identifier by the packet length; sending update information to a second scheduler, where the update information includes that the queue length of the virtual queue is increased by the packet length; and decreasing the queue length of the virtual queue by the packet length according to a bandwidth scheduling result that is corresponding to the update information and sent by the second scheduler. In this way, even if back pressure appears in the destination physical egress port corresponding to the target packet, that the first scheduler sends the target packet is not affected.

18 Claims, 5 Drawing Sheets

(51) Int. Cl.
*H04L 12/863* (2013.01)
*H04L 12/931* (2013.01)
*H04L 12/935* (2013.01)

(56) References Cited

U.S. PATENT DOCUMENTS

| | | | |
|---|---|---|---|
| 2005/0002334 A1 | 1/2005 | Chao et al. | |
| 2005/0147032 A1* | 7/2005 | Lyon | H04L 47/10 370/229 |
| 2007/0171929 A1* | 7/2007 | Kim | H04L 47/527 370/412 |
| 2007/0253425 A1 | 11/2007 | Hamilton et al. | |
| 2008/0175259 A1 | 7/2008 | Chao et al. | |
| 2014/0016463 A1* | 1/2014 | Kitada | H04L 47/20 370/230.1 |
| 2016/0037559 A1* | 2/2016 | Malik | H04W 74/08 370/329 |
| 2016/0065484 A1* | 3/2016 | Suzuki | H04L 47/522 370/415 |

FOREIGN PATENT DOCUMENTS

| | | |
|---|---|---|
| CN | 101009649 A | 8/2007 |
| CN | 101378364 A | 3/2009 |
| CN | 102104545 A | 6/2011 |
| CN | 102739510 A | 10/2012 |
| CN | 102857440 A | 1/2013 |
| CN | 103533090 A | 1/2014 |
| CN | 104618265 A | 5/2015 |
| WO | 2014088780 A1 | 6/2014 |

OTHER PUBLICATIONS

Machine Translation and Abstract of Chinese Publication No. CN1968186, May 23, 2007, 7 pages.
Machine Translation and Abstract of Chinese Publication No. CN101378364, Mar. 4, 2009, 15 pages.
Machine Translation and Abstract of Chinese Publication No. CN102104545, Jun. 22, 2011, 14 pages.
Machine Translation and Abstract of Chinese Publication No. CN102739510, Oct. 17, 2012, 8 pages.
Machine Translation and Abstract of Chinese Publication No. CN102857440, Jan. 2, 2013, 11 pages.
Machine Translation and Abstract of Chinese Publication No. CN103533090, Jan. 22, 2014, 15 pages.
Machine Translation and Abstract of Chinese Publication No. CN104618265, May 13, 2015, 15 pages.
Foreign Communication From a Counterpart Application, Chinese Application No. 201410853247.8, Chinese Office Action dated Apr. 26, 2017, 8 pages.
Foreign Communication From a Counterpart Application, PCT Application No. PCT/CN2015/096467, English Translation of International Search Report dated Mar. 7, 2016, 2 pages.
Foreign Communication From a Counterpart Application, PCT Application No. PCT/CN2015/096467, English Translation of Written Opinion dated Mar. 7, 2016, 6 pages.
Foreign Communication From a Counterpart Application, European Application No. 15875053.9, Extended European Search Report dated Nov. 29, 2017, 11 pages.

* cited by examiner

PACKET FORWARDING METHOD AND APPARATUS

CROSS-REFERENCE TO RELATED APPLICATIONS

This application is a continuation of International Patent Application No. PCT/CN2015/096467 filed on Dec. 4, 2015, which claims priority to Chinese Patent Application No. 201410853247.8 filed on Dec. 30, 2014. The disclosures of the aforementioned applications are hereby incorporated by reference in their entireties.

TECHNICAL FIELD

The present application relates to the computer field, and in particular, to a packet forwarding method and apparatus.

BACKGROUND

In order to effectively transmit data, a scheduler in a transmission link needs to properly schedule bandwidth for the transmission link or a sub-link/sub-channel.

In a data transmission process, the scheduler forms a packet queue using received packets according to a specific rule, and then sequentially processes the packets in the packet queue. According to a length of a processed packet, a queue identifier of the packet queue in which the packet is located, and an obtained corresponding bandwidth scheduling result, proper dequeue time of the packet is determined. The scheduler extracts the packet from the packet queue according to scheduled bandwidth, and sends the packet to an egress port corresponding to the packet.

However, in a port aggregation trunk connection mode, an output end of the scheduler is connected to multiple sub-links or sub-ports, and packets received by the scheduler may be output from physical egress ports of different sub-links or sub-ports according to a specific rule. That is, the packets in the packet queue formed by the scheduler may correspond to different physical egress ports. In a scheduling process of the scheduler, if back pressure appears in a physical egress port corresponding to a packet located in a queue head or a packet cannot be output, according to a bandwidth scheduling rule, no bandwidth is to be scheduled for the physical egress port in which the back pressure appears. Therefore, the scheduler cannot obtain a bandwidth scheduling result for the packet located in the queue head, and the scheduler cannot output the packet located in the queue head from the packet queue either until the scheduler obtains the bandwidth scheduling result. In this case, even if no back pressure appears in a corresponding physical egress port of another packet located behind the queue head of the packet queue, the other packet cannot be output from the scheduler either. The phenomenon that a dequeue failure of the packet in the queue head causes the scheduler to stop sending a packet is generally referred to as a head-of-line blocking phenomenon. The head-of-line blocking phenomenon significantly affects system bandwidth utilization.

SUMMARY

In order to resolve the foregoing technical problem, embodiments of the present application provide a packet forwarding method and apparatus such that a first scheduler may send a packet to a corresponding physical egress port with no need to wait for a bandwidth scheduling result. In this way, even if back pressure appears in a physical egress port in multiple physical egress ports connected to the first scheduler, no head-of-line blocking phenomenon appears in the first scheduler.

According to a first aspect, an embodiment of the present application provides a packet forwarding method, including receiving, by a first scheduler, a target packet, where the target packet includes a packet length, a queue identifier, and egress port information, sending, by the first scheduler, the target packet to a destination physical egress port corresponding to the egress port information, and increasing, according to the queue identifier, a queue length of a virtual queue corresponding to the queue identifier by the packet length, where the queue length represents a total amount of needed bandwidth in which the first scheduler sends a packet having the queue identifier, sending, by the first scheduler, update information to a second scheduler, where the update information includes that the queue length of the virtual queue is increased by the packet length, and decreasing, by the first scheduler, the queue length of the virtual queue by the packet length according to a bandwidth scheduling result corresponding to the update information and sent by the second scheduler.

In a first possible implementation manner of the first aspect, the method further includes pre-establishing, by a port controller, an association relationship between the egress port information of the destination physical egress port and a timeslot, where the port controller is connected to the destination physical egress port.

With reference to the first possible implementation manner of the first aspect, in a second possible implementation manner, the method further includes obtaining, by the port controller, the target packet sent by the first scheduler, determining, by the port controller according to the queue identifier and the packet length that are of the target packet, a destination timeslot for outputting the target packet, and adding the target packet to a packet queue corresponding to the destination timeslot.

With reference to the second possible implementation manner of the first aspect, in a third possible implementation manner, the method further includes obtaining, by the port controller, bandwidth scheduled for the destination physical egress port according to the update information, where the bandwidth scheduled for the destination physical egress port is bandwidth that is scheduled by a logical port for the destination physical egress port according to the bandwidth scheduling result, extracting, by the port controller in the destination timeslot, the target packet from the packet queue according to the association relationship and available bandwidth of the destination physical egress port, and outputting the target packet using the destination physical egress port corresponding to the destination timeslot.

With reference to the first aspect or the first or second or third possible implementation manner of the first aspect, in a fourth possible implementation manner, before sending, by the first scheduler, the target packet to a destination physical egress port corresponding to the egress port information, the method further includes determining, by the first scheduler by means of a discard calculation, whether to discard the target packet, and executing, by the first scheduler, the sending the target packet to the destination physical egress port corresponding to the egress port information when a determining result is to skip discarding the target packet.

According to a second aspect, an embodiment of the present application provides a packet forwarding apparatus, including a receiving unit configured to receive a target packet, where the target packet includes a packet length, a queue identifier, and egress port information, a first sending unit configured to send the target packet to a destination physical egress port corresponding to the egress port information, and increase, according to the queue identifier, a queue length of a virtual queue corresponding to the queue identifier by the packet length, where the queue length represents a total amount of needed bandwidth in which the first scheduler sends a packet having the queue identifier, a second sending unit configured to send update information to a second scheduler, where the update information includes that the queue length of the virtual queue is increased by the packet length, and a processing unit configured to decrease the queue length of the virtual queue by the packet length according to a bandwidth scheduling result corresponding to the update information and sent by the second scheduler.

In a first possible implementation manner of the second aspect, the apparatus further includes an establishment unit configured to pre-establish an association relationship between the egress port information of the destination physical egress port and a timeslot, where the port controller is connected to the destination physical egress port.

With reference to the first possible implementation manner of the second aspect, in a second possible implementation manner, the apparatus further includes a first obtaining unit configured to obtain the target packet sent by the first scheduler, and an enqueue unit configured to determine, according to the queue identifier and the packet length that are of the target packet, a destination timeslot for outputting the target packet, and add the target packet to a packet queue corresponding to the destination timeslot.

With reference to the second possible implementation manner of the second aspect, in a third possible implementation manner, the apparatus further includes a second obtaining unit configured to obtain bandwidth scheduled for the destination physical egress port according to the update information, where the bandwidth scheduled for the destination physical egress port is bandwidth that is scheduled by a logical port for the destination physical egress port according to the bandwidth scheduling result, and an output unit configured to extract, in the destination timeslot, the target packet from the packet queue according to the association relationship and available bandwidth of the destination physical egress port, and output the target packet using the destination physical egress port corresponding to the destination timeslot.

With reference to the second aspect or the first or second or third possible implementation manner of the second aspect, in a fourth possible implementation manner, before the first sending unit is triggered, the apparatus further includes a discard determining unit configured to determine, by means of a discard calculation, whether to discard the target packet, where the first sending unit is triggered when a determining result is to skip discarding the target packet.

From the foregoing technical solutions, it may be learnt that the first scheduler may first send, according to egress port information of a target packet, the target packet to a physical egress port corresponding to the egress port information, correspondingly increase a queue length of the virtual queue that represents a total amount of needed bandwidth in which the first scheduler sends a packet having the queue identifier, and decrease the queue length by a corresponding length to maintain proper available bandwidth for the virtual queue when receiving the bandwidth scheduling result. When the packet arrives at the first scheduler, the first scheduler may send the packet to a corresponding physical egress port with no need to wait for the bandwidth scheduling result, and a port controller corresponding to the physical egress port determines an output occasion of the target packet. In this way, even if back pressure appears in a destination physical egress port corresponding to the target packet, that the first scheduler sends the target packet to the destination physical egress port is not affected, and that another packet is output from the first scheduler is not affected either.

BRIEF DESCRIPTION OF DRAWINGS

In order to describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

To effectively transmit data, a scheduler in a transmission link needs to properly schedule bandwidth for the transmission link or a sub-link/sub-channel. In other approaches the scheduler receives packets, forms a packet queue using the received packets according to a specific rule, and then sequentially processes the packets in the packet queue, which includes determining proper dequeue time of a packet. Before obtaining a bandwidth scheduling result corresponding to the packet, the scheduler cannot determine the proper dequeue time of the packet, and therefore cannot send the packet to a corresponding physical egress port. That is, before bandwidth scheduling is finished, the packet cannot be dequeued from the packet queue in which the packet is located. When the scheduler is in a trunk connection mode, an output end of the scheduler is connected to multiple sub-links or sub-ports, and the packets in the packet queue formed by the scheduler may correspond to different physical egress ports. In the packet queue formed by the scheduler, when back pressure appears in a physical egress port corresponding to a packet located in a queue head, the packet located in the queue head cannot be output using the scheduler. Moreover, because the scheduler sequentially processes the packets in the packet queue, when the packet in the queue head cannot be output, another packet located in the packet queue cannot be output from the scheduler either even if no back pressure appears in a corresponding physical egress port, which causes a head-of-line blocking phenomenon. The head-of-line blocking phenomenon significantly affects bandwidth scheduling efficiency of the whole packet queue.

Therefore, in embodiments of the present application, the first scheduler may first send, according to egress port information of a target packet, the target packet to a physical egress port corresponding to the egress port information, correspondingly increase a queue length of the virtual queue that represents a total amount of needed bandwidth in which the first scheduler sends a packet having the queue identifier, and decrease the queue length by a corresponding length to maintain proper available bandwidth for the virtual queue when receiving the bandwidth scheduling result. When the packet arrives at the first scheduler, the first scheduler may send the packet to a corresponding physical egress port with no need to wait for the bandwidth scheduling result, and a port controller corresponding to the physical egress port determines an output occasion of the target packet. In this way, even if back pressure appears in a destination physical egress port corresponding to the target packet, that the first scheduler sends the target packet to the destination physical egress port is not affected, that another packet is output from the first scheduler is not affected either, and no head-of-line blocking phenomenon appears.

Especially in the trunk connection mode, the first scheduler does not need to determine an occasion on which a received packet is output from a physical egress port, and instead, a port controller one-to-one corresponding to the physical egress port is responsible for determining an output timeslot of the packet. Therefore, a packet may be sent to a corresponding physical egress port with no need to wait for a bandwidth scheduling result. A packet queue established by the first scheduler is only a virtual queue, mainly used to measure a queue length change. In a packet queue established by a port controller, all packets that form the packet queue are packets output using a physical egress port corresponding to the port controller. When a back pressure phenomenon appears in a physical egress port, only output of a packet queue established by a corresponding port controller is affected, and packet forwarding of the first scheduler and packet forwarding of another sub-link or sub-channel connected to the first scheduler are not affected. Therefore, no head-of-line blocking phenomenon appears in the first scheduler.

The following describes the technical solutions in the embodiments of the present application with reference to the accompanying drawings in the embodiments of the present application. The described embodiments are merely a part rather than all of the embodiments of the present application. All other embodiments obtained by a person of ordinary skill in the art based on the embodiments of the present application without creative efforts shall fall within the protection scope of the present application.

Embodiment 1

Figure 1:
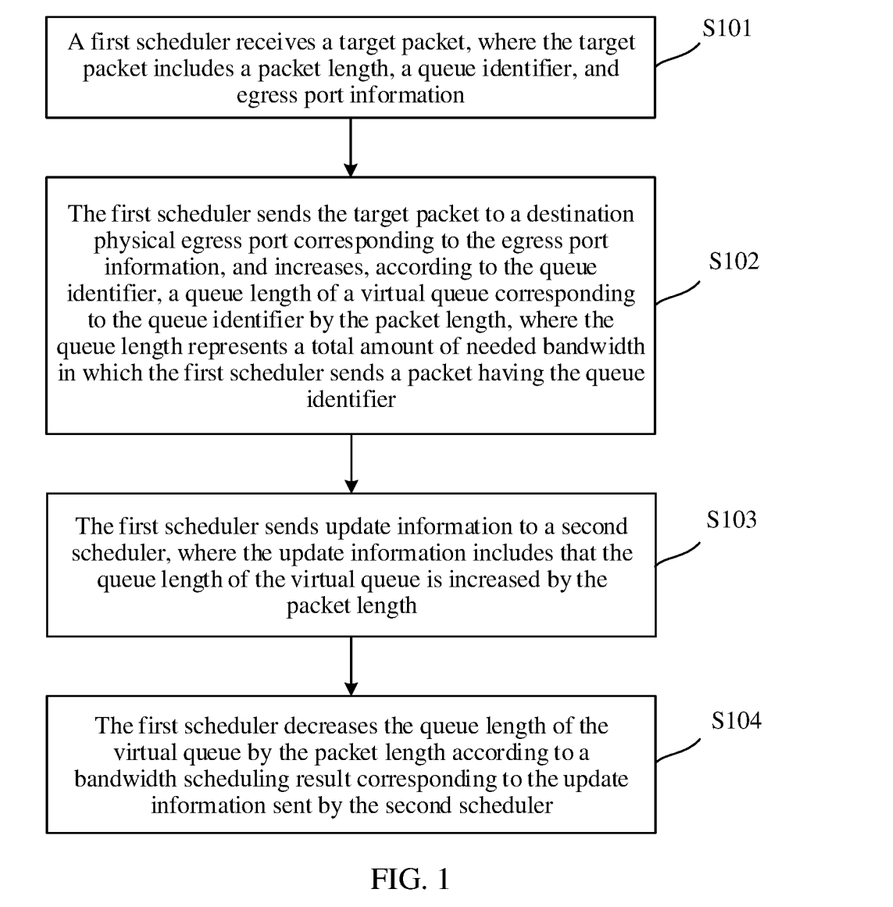
FIG. 1 is a method flowchart of a packet forwarding method according to an embodiment of the present application.

FIG. 1 is a method flowchart of a packet forwarding method according to an embodiment of the present application. The method includes the following steps.

Step S101: A first scheduler receives a target packet, where the target packet includes a packet length, a queue identifier, and egress port information.

For example, in a trunk connection mode, an output port of the first scheduler may be connected to multiple sub-links or sub-ports. One sub-link or sub-port may have one physical egress port, and the physical egress port one-to-one corresponds to a port controller.

Step S102: The first scheduler sends the target packet to a destination physical egress port corresponding to the egress port information, and increases, according to the queue identifier, a queue length of a virtual queue corresponding to the queue identifier by the packet length, where the queue length represents a total amount of needed bandwidth in which the first scheduler sends a packet having the queue identifier.

For example, the virtual queue is not a packet queue established by the first scheduler by means of a rule. The virtual queue only measures a difference between a total packet length of a packet that has the queue identifier and is received by the first scheduler and a total packet length of a packet that has the queue identifier and is sent by the first scheduler. The first scheduler may measure a queue length change of the virtual queue using a virtual queue length (VQL) counter.

Step S103: The first scheduler sends update information to a second scheduler, where the update information includes that the queue length of the virtual queue is increased by the packet length.

Step S104: The first scheduler decreases the queue length of the virtual queue by the packet length according to a bandwidth scheduling result corresponding to the update information sent by the second scheduler.

For example, the second scheduler outputs the bandwidth scheduling result according to queue information of the virtual queue in the update information, the increased queue length of the virtual queue, or the packet length, and separately sends the bandwidth scheduling result to the first scheduler and a logical port. The logical port corresponds to the destination physical egress port. In the trunk connection mode, the second scheduler may be a multi-level scheduler (trunk scheduler). In the trunk connection mode, the logical port may separately correspond to multiple physical egress ports that include the destination physical egress port.

Because the target packet is sent from the first scheduler, the first scheduler decreases the queue length of the virtual queue by a corresponding packet length according to the bandwidth scheduling result, where a queue length obtained after the decrease represents a total amount of needed bandwidth in which the first scheduler sends a packet having the queue identifier after sending the target packet.

It may be learnt that the first scheduler may first send, according to egress port information of a target packet, the target packet to a physical egress port corresponding to the egress port information, correspondingly increase a queue length of the virtual queue that represents a total amount of needed bandwidth in which the first scheduler sends a packet having the queue identifier, and decrease the queue length by a corresponding length to maintain proper available bandwidth for the virtual queue when receiving the bandwidth scheduling result. When the packet arrives at the first scheduler, the first scheduler may send the packet to a corresponding physical egress port with no need to wait for the bandwidth scheduling result, and a port controller corresponding to the physical egress port determines an output occasion of the target packet. In this way, even if back pressure appears in a destination physical egress port corresponding to the target packet, that the first scheduler sends the target packet to the destination physical egress port is not affected, and that another packet is output from the first scheduler is not affected either.

Optionally, before the first scheduler receives the target packet and sends the target packet to the physical egress port corresponding to the egress port information, whether to discard the target packet may be further determined according to data such as the packet length of the target packet and a queue length of a virtual queue corresponding to the queue identifier of the target packet. For example, a manner such as tail drop or random early drop (weighted random early drop (WRED)) may be used to avoid packet queue overlength and over-congestion appearing in the first scheduler.

In this embodiment of the present application, the first scheduler sends the target packet to the destination physical egress port. The target packet first arrives at a port controller uniquely corresponding to the destination physical egress port, and the port controller is connected to the destination physical egress port. The port controller determines an occasion on which the target packet is output from the destination physical egress port. This feature is described below in detail.

The port controller includes a pre-established association relationship. The association relationship is a correspondence between the egress port information of the destination physical egress port and a timeslot, where all timeslots correspond to the egress port information. The port controller may establish, according to a specific rule, a packet queue one-to-one corresponding to a timeslot, and a packet in the packet queue may be output from the destination physical egress port in the timeslot corresponding to the packet queue. A quantity of the timeslots may be determined according to maximum output bandwidth. For example, if a granularity for dividing timeslots of the destination physical egress port is 1 millisecond (ms), and the maximum output bandwidth is 200 ms, 200 timeslots may be established for the destination physical egress port.

Figure 2:
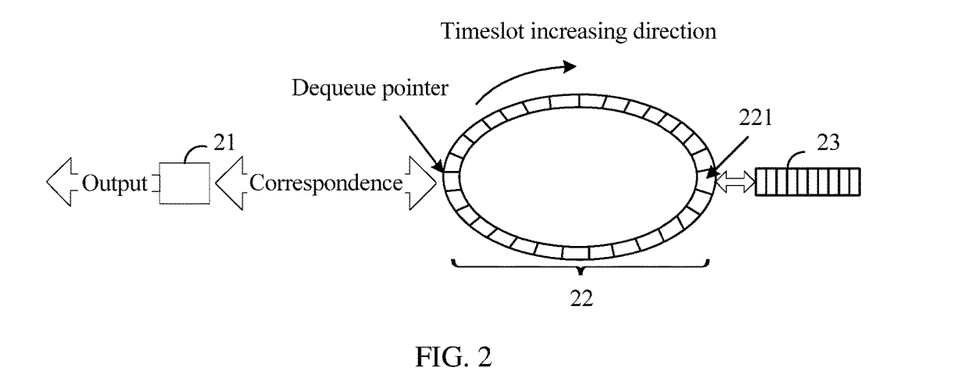
FIG. 2 is a schematic structural diagram of a timeslot linked list of a port controller according to an embodiment of the present application.

A manner of establishing the association relationship in a form of a timeslot linked list is described using an accompanying drawing. As shown in FIG. 2, FIG. 2 is a schematic structural diagram of a timeslot linked list of a port controller according to this embodiment of the present application, where the timeslot linked list of the port controller includes a destination physical egress port 21 corresponding to the port controller, a timeslot linked list 22 has a timeslot increasing direction shown in FIG. 2, and one timeslot 221 of multiple timeslots in the timeslot linked list 22. Furthermore, a packet queue 23 corresponds one-to-one with the timeslot 221. All the multiple timeslots in the timeslot linked list 22 correspond to egress port information of the destination physical egress port 21. When the timeslot 221 moves to a shown dequeue pointer location according to the timeslot increasing direction, the port controller may control, according to the association relationship, a packet in the packet queue 23 corresponding to the timeslot 221 to be output using the destination physical egress port 21. Establishing the association relationship in the form of a linked list is a preferred manner provided in this embodiment of the present application, and the association relationship in the present application may also be established in another manner.

Because the association relationship is a correspondence between egress port information and a timeslot, a quantity of timeslots in the association relationship is irrelevant to a quantity of packet queues supported by a system. In other words, the port controller does not need to individually establish a correspondence for each packet queue for forwarding. Moreover, because the association relationship is established based on the destination physical egress port, a packet in a packet queue one-to-one corresponding to a timeslot in the association relationship is output only from the destination physical egress port.

The following describes that the port controller adds the target packet to a corresponding packet queue when receiving the target packet sent by the first scheduler.

Figure 3:
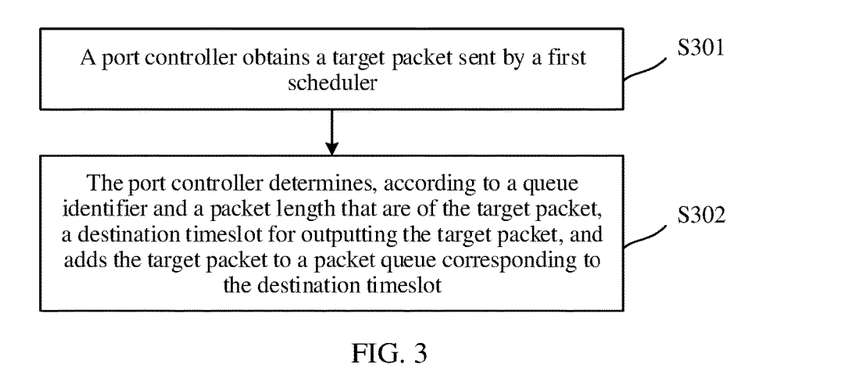
FIG. 3 is a method flowchart of a packet enqueue method according to an embodiment of the present application.

FIG. 3 is a method flowchart of a packet enqueue method according to this embodiment of the present application. As shown in FIG. 3, the method includes the following steps.

Step S301: The port controller obtains the target packet sent by the first scheduler.

Step S302: The port controller determines, according to the queue identifier and the packet length that are of the target packet, a destination timeslot for outputting the target packet, and adds the target packet to a packet queue corresponding to the destination timeslot.

For example, the port controller includes multiple packet queues corresponding to timeslots. Therefore, after receiving the packet, the port controller needs to first figure out the destination timeslot in which the target packet may be output, and then add the target packet to the packet queue corresponding to the destination timeslot, generally to a tail of the packet queue. The destination timeslot may generally be figured out according to the queue identifier and the packet length that are of the target packet, bandwidth configuration information, dequeue information, and the like. In an example of FIG. 2, when the port controller determines, for example by means of calculation, that the destination timeslot in which the target packet may be output is the timeslot 221 in the timeslot linked list 22, the target packet may be added to the packet queue 23 corresponding to the timeslot 221, for example, to a tail of the packet queue 23.

The port controller may sequentially output packets in the packet queues corresponding to the timeslots according to a sequence of the timeslots.

Figure 4:
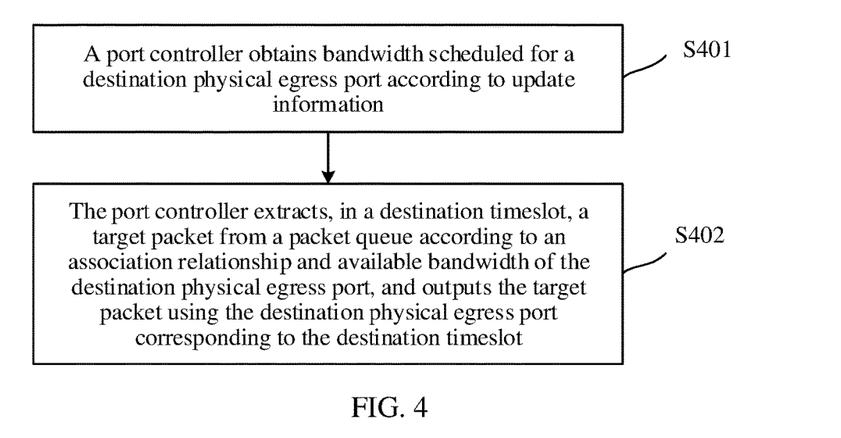
FIG. 4 is a method flowchart of a packet output method according to an embodiment of the present application.

The following describes, according to an accompanying drawing, how the port controller outputs the target packet according to the association relationship. FIG. 4 is a method flowchart of a packet output method according to this embodiment of the present application. As shown in FIG. 4, the method includes the following steps.

Step S401: The port controller obtains bandwidth scheduled for the destination physical egress port according to the update information, where the bandwidth scheduled for the destination physical egress port is bandwidth scheduled by a logical port for the destination physical egress port according to the bandwidth scheduling result.

For example, the second scheduler determines the bandwidth scheduling result according to the update information, and sends the bandwidth scheduling result to the logical port corresponding to the destination physical egress port. The logical port determines, according to the bandwidth scheduling result, how much bandwidth is to be allocated to the destination physical egress port. The present application sets no limitation on an execution sequence of step S302 in the embodiment corresponding to FIG. 3 and step S401.

In the trunk connection mode, the logical port may separately correspond to the multiple physical egress ports that include the destination physical egress port. The logical port may allocate bandwidth scheduled by the second scheduler to all N physical egress ports corresponding to the logical port, or only to M physical egress ports, where N is an integer greater than or equal to 2, and M is an integer greater than or equal to 1 and less than N. The present application sets no limitation on a manner in which the logical port allocates bandwidth to a physical egress port. It should be noted that based on saving system resources, if back pressure appears in the destination physical egress port, the destination physical egress port cannot obtain the allocated bandwidth from the logical port.

Step S402: The port controller extracts, in the destination timeslot, the target packet from the packet queue according to the association relationship and available bandwidth of the destination physical egress port, and outputs the target packet using the destination physical egress port corresponding to the destination timeslot.

Figure 5:
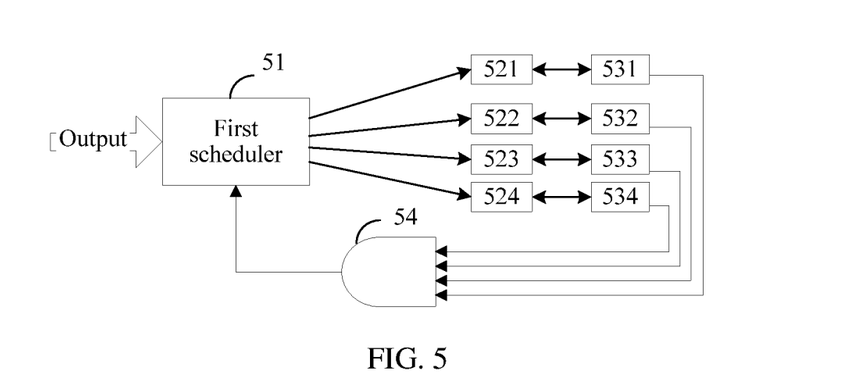
FIG. 5 is a schematic diagram of back pressure in a physical egress port according to an embodiment of the present application.

With reference to the first scheduler and the port controller, the following describes a case in which back pressure appears in a physical egress port. FIG. 5 is a schematic diagram of back pressure in a physical egress port according to this embodiment of the present application. As shown in FIG. 5, FIG. 5 includes, a first scheduler 51, where a right side of the first scheduler 51 is a receive end configured to receive a packet, a left side of the first scheduler 51 is an output end. The receive end of the first scheduler 51 is connected to four sub-links as shown in FIG. 5 and connected to four physical egress ports 531 to 534 using the four sub-links respectively, and the four physical egress ports 531 to 534 respectively have corresponding port controllers 521 to 524. If a back pressure phenomenon appears in the physical egress port 531, when egress port information received by the first scheduler 51 is a packet a of the physical egress port 531, the first scheduler 51 may also send the packet to the physical egress port 531. In this case, although a sub-link between the first scheduler 51 and the physical egress port 531 cannot be used, that the first scheduler 51 sends a packet using the sub-link is not affected, and that the first scheduler 51 sends a packet using another sub-link is not affected either. Even if the back pressure phenomenon appears in any two or three of the four physical egress ports 531 to 534, that the first scheduler 51 sends a packet is not affected. Only when back pressure appears in all the four physical egress ports 531 to 534 connected to the first scheduler 51, as shown by a dotted line in FIG. 5, an AND gate 54 outputs back pressure only when all four inputs are back pressure. Therefore, the first scheduler 51 is affected, and a head-of-line blocking problem appears. It should be noted that the AND gate 54 may be understood as a diagram used to more easily present functions that the first scheduler 51 and the physical egress ports 531 to 534 can implement, which is not limited to that such a physical connection and the AND gate 54 actually exist between the first scheduler 51 and the physical egress ports 531 to 534.

It may be learnt that when the output end of the first scheduler is connected to multiple physical egress ports, that back pressure appears in one physical egress port of the multiple physical egress ports does not cause a head-of-line blocking phenomenon appearing in the first scheduler, and does not affect packet forwarding of another physical egress port connected to the first scheduler. Therefore, a head-of-line blocking problem in the trunk connection mode in other approaches is effectively resolved.

Embodiment 2

Figure 6:
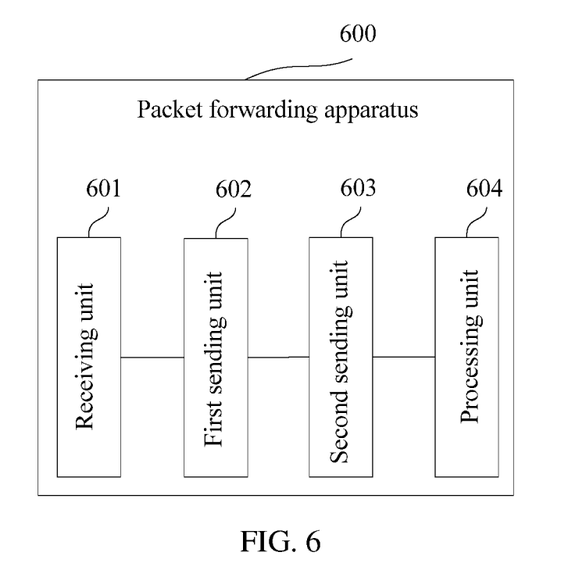
FIG. 6 is an apparatus structural diagram of a packet forwarding apparatus according to an embodiment of the present application.

FIG. 6 is an apparatus structural diagram of a packet forwarding apparatus 600 according to an embodiment of the present application, where the packet forwarding apparatus 600 includes a receiving unit 601, a first sending unit 602, a second sending unit 603, and a processing unit 604.

The receiving unit 601 is configured to receive a target packet, where the target packet includes a packet length, a queue identifier, and egress port information.

For example, the receiving unit 601 may execute the method of step S101 in Embodiment 1 in FIG. 1, which is not repeatedly described herein.

The first sending unit 602 is configured to send the target packet to a destination physical egress port corresponding to the egress port information, and increase, according to the queue identifier, a queue length of a virtual queue corresponding to the queue identifier by the packet length, where the queue length represents a total amount of needed bandwidth in which the first scheduler sends a packet having the queue identifier.

For example, the virtual queue is not a packet queue established by means of a rule. The virtual queue only measures a difference between a total packet length of a packet that has the queue identifier and is received by the first scheduler and a total packet length of a packet that has the queue identifier and is sent by the first scheduler. The first scheduler may measure a queue length change of the virtual queue using a VQL counter.

The second sending unit 603 is configured to send update information to a second scheduler, where the update information includes that the queue length of the virtual queue is increased by the packet length.

For example, the second sending unit 603 may execute the method of step S103 in Embodiment 1 in FIG. 1, which is not repeatedly described herein.

The processing unit 604 is configured to decrease the queue length of the virtual queue by the packet length according to a bandwidth scheduling result corresponding to the update information and sent by the second scheduler.

For example, the second scheduler outputs the bandwidth scheduling result according to queue information of the virtual queue in the update information, the increased queue length of the virtual queue, or the packet length, and separately sends the bandwidth scheduling result to the processing unit 604 and a logical port. The logical port corresponds to the destination physical egress port. In a trunk connection mode, the second scheduler may be a trunk scheduler. In the trunk connection mode, the logical port may separately correspond to multiple physical egress ports that include the destination physical egress port.

Because the target packet is sent from the first sending unit 602, the processing unit 604 decreases the queue length of the virtual queue by a corresponding packet length according to the bandwidth scheduling result. A queue length obtained after the decrease represents a total amount of needed bandwidth in which the first sending unit 602 sends a packet having the queue identifier after sending the target packet.

It may be learnt that the first scheduler may first send, according to egress port information of a target packet, the target packet to a physical egress port corresponding to the egress port information, correspondingly increase a queue length of the virtual queue that represents a total amount of needed bandwidth in which the first scheduler sends a packet having the queue identifier, and decrease the queue length by a corresponding length to maintain proper available bandwidth for the virtual queue when receiving the bandwidth scheduling result. When the packet arrives at the first scheduler, the first scheduler may send the packet to a corresponding physical egress port with no need to wait for the bandwidth scheduling result, and a port controller corresponding to the physical egress port determines an output occasion of the target packet. In this way, even if back pressure appears in a destination physical egress port corresponding to the target packet, that the first scheduler sends the target packet to the destination physical egress port is not affected, and that another packet is output from the first scheduler is not affected either.

Figure 7:
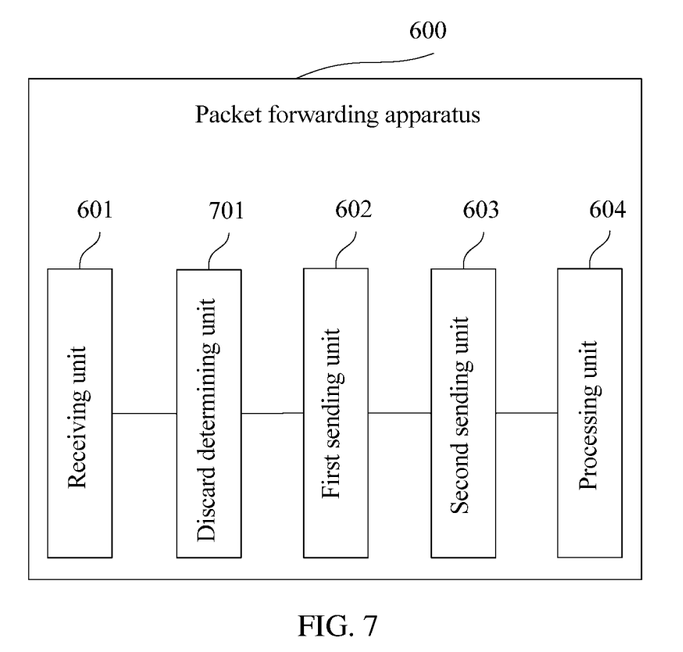
FIG. 7 is an apparatus structural diagram of a packet forwarding apparatus according to an embodiment of the present application.

Optionally, before the receiving unit 601 receives the target packet and the first sending unit 602 sends the target packet to the physical egress port corresponding to the egress port information, whether to discard the target packet may be further determined according to data such as the packet length of the target packet and a queue length of a virtual queue corresponding to the queue identifier of the target packet. For example, a manner such as tail drop or WRED may be used to avoid packet queue over-length and over-congestion appearing in the first scheduler. Based on FIG. 6, FIG. 7 is an apparatus structural diagram of the packet forwarding apparatus 600 according to this embodiment of the present application. As shown in FIG. 7, before the first sending unit 602 is triggered, the packet forwarding apparatus 600 may further include a discard determining unit 701.

The discard determining unit 701 is configured to determine, by means of a discard calculation, whether to discard the target packet.

The first sending unit 602 is triggered when a determining result is to skip discarding the target packet.

Figure 8:
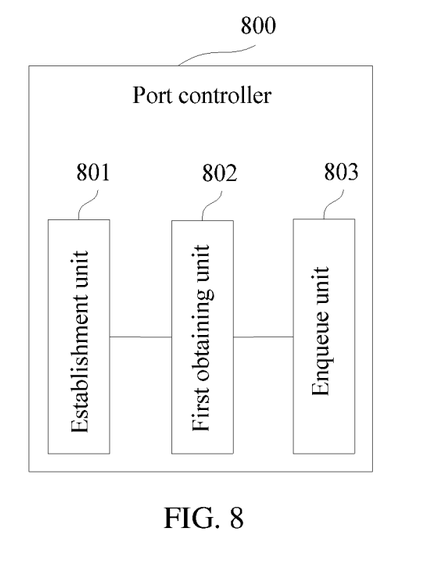
FIG. 8 is an apparatus structural diagram of a port controller according to an embodiment of the present application.

In this embodiment of the present application, the first sending unit 602 sends the target packet to the destination physical egress port. The target packet first arrives at a port controller uniquely corresponding to the destination physical egress port, and the port controller is connected to the destination physical egress port. The port controller determines an occasion on which the target packet is output from the destination physical egress port. This feature is described below in detail. Based on the embodiment corresponding to FIG. 6, FIG. 8 is an apparatus structural diagram of a port controller 800 according to this embodiment of the present application. The port controller 800 includes an establishment unit 801, a first obtaining unit 802, and an enqueue unit 803.

The establishment unit 801 is configured to pre-establish an association relationship between the egress port information of the destination physical egress port and a timeslot, and the port controller 800 is connected to the physical egress port.

For example, the association relationship is a correspondence between the egress port information of the destination physical egress port and a timeslot, and all timeslots correspond to the egress port information. The establishment unit 801 may establish, according to a specific rule, a packet queue one-to-one corresponding to a timeslot, and a packet in the packet queue may be output from the destination physical egress port in the timeslot corresponding to the packet queue. A quantity of the timeslots may be determined according to maximum output bandwidth. For example, if a granularity for dividing timeslots of the destination physical egress port is 1 ms, and the maximum output bandwidth is 200 ms, 200 timeslots may be established for the destination physical egress port.

The first obtaining unit 802 is configured to obtain the target packet sent by the first scheduler.

The enqueue unit 803 is configured to determine, according to the queue identifier and the packet length that are of the target packet, a destination timeslot for outputting the target packet, and add the target packet to a packet queue corresponding to the destination timeslot.

For example, the port controller 800 includes multiple packet queues corresponding to timeslots. Therefore, after the first obtaining unit 802 receives the packet, the enqueue unit 803 needs to first figure out the destination timeslot in which the target packet can be output, and then add the target packet to the packet queue corresponding to the destination timeslot, generally to a tail of the packet queue. The destination timeslot may generally be figured out according to the queue identifier and the packet length that are of the target packet, bandwidth configuration information, dequeue information, and the like.

Figure 9:
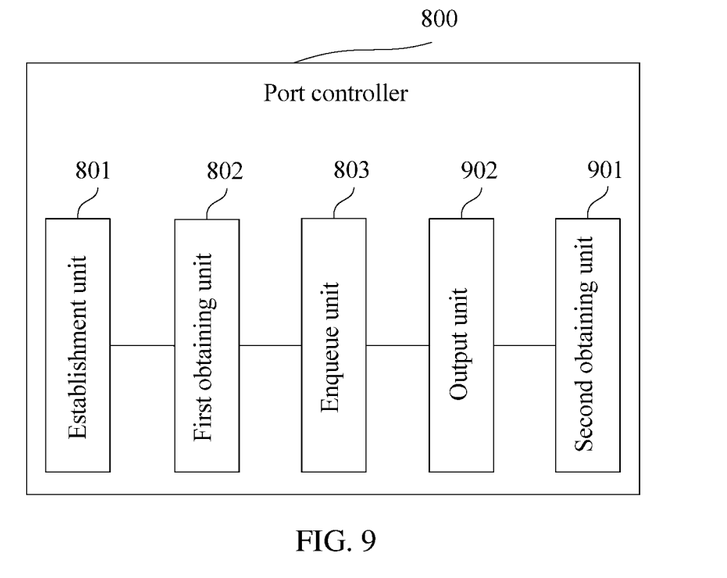
FIG. 9 is an apparatus structural diagram of a port controller according to an embodiment of the present application.

The following describes, according to an accompanying drawing, how the port controller 800 outputs the target packet according to the association relationship. Based on FIG. 8, FIG. 9 is an apparatus structural diagram of the port controller 800 according to this embodiment of the present application. The port controller 800 further includes a second obtaining unit 901 and an output unit 902.

The second obtaining unit 901 is configured to obtain bandwidth scheduled for the destination physical egress port according to the update information, and the bandwidth scheduled for the destination physical egress port is bandwidth that is scheduled by a logical port for the destination physical egress port according to the bandwidth scheduling result.

For example, the second scheduler determines the bandwidth scheduling result according to the update information, and sends the bandwidth scheduling result to the logical port corresponding to the destination physical egress port. The logical port determines, according to the bandwidth scheduling result, how much bandwidth is to be allocated to the destination physical egress port. The present application sets no limitation on a trigger sequence of the first obtaining unit 802 in the embodiment corresponding to FIG. 8 and the second obtaining unit 901.

In the trunk connection mode, the logical port may separately correspond to the multiple physical egress ports that include the destination physical egress port. The logical port may allocate bandwidth scheduled by the second scheduler to all N physical egress ports corresponding to the logical port, or only to M physical egress ports, where N is an integer greater than or equal to 2, and M is an integer greater than or equal to 1 and less than N. The present application sets no limitation on a manner in which the logical port allocates bandwidth to a physical egress port. It should be noted that based on saving system resources, if back pressure appears in the destination physical egress port, the destination physical egress port cannot obtain the allocated bandwidth from the logical port.

The output unit 902 is configured to extract, in the destination timeslot, the target packet from the packet queue according to the association relationship and available bandwidth of the destination physical egress port, and output the target packet using the destination physical egress port corresponding to the destination timeslot.

The output unit 902 may sequentially output packets in the packet queues corresponding to the timeslots according to a sequence of the timeslots.

Embodiment 3

Figure 10:
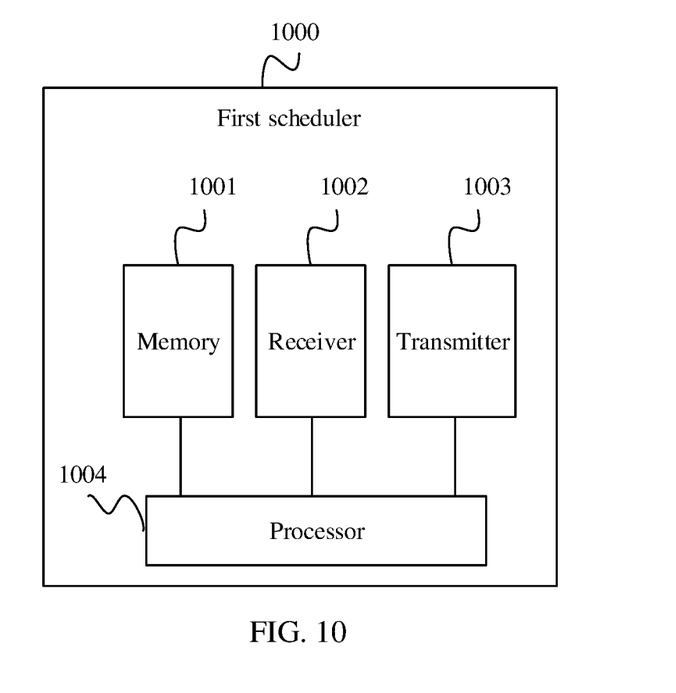
FIG. 10 is a schematic structural diagram of hardware of a first scheduler according to an embodiment of the present application.

Referring to FIG. 10, FIG. 10 is a schematic structural diagram of hardware of a first scheduler 1000 according to this embodiment of the present application. The first scheduler 1000 includes a memory 1001, a receiver 1002, a transmitter 1003, and a processor 1004 that is separately connected to the memory 1001, the receiver 1002, and the transmitter 1003. The memory 1001 is configured to store a set of program instructions, and the processor 1004 is configured to invoke the program instructions stored in the memory 1001 to execute the operations of triggering the receiver 1002 to receive a target packet, where the target packet includes a packet length, a queue identifier, and egress port information, triggering the transmitter 1003 to send the target packet to a destination physical egress port corresponding to the egress port information, and increase, according to the queue identifier, a queue length of a virtual queue corresponding to the queue identifier by the packet length, where the queue length represents a total amount of needed bandwidth in which the first scheduler 1000 sends a packet having the queue identifier, triggering the transmitter 1003 to send update information to a second scheduler, where the update information includes that the queue length of the virtual queue is increased by the packet length, and decreasing the queue length of the virtual queue by the packet length according to a bandwidth scheduling result corresponding to the update information sent by the second scheduler.

Optionally, the processor 1004 may be a central processing unit (CPU), the memory 1001 may be an internal memory of a random access memory (RAM) type, the receiver 1002 and the transmitter 1003 may include a common physical interface, and the physical interface may be an Ethernet interface or an asynchronous transfer mode (ATM) interface. The processor 1004, the transmitter 1003, the receiver 1002, and the memory 1001 may be integrated into one or more independent circuits or hardware, for example, an application-specific integrated circuit (ASIC).

In the embodiments of the present application, a word "first" in a first scheduler is only used as a name identifier, and does not mean being the first in a sequence. This rule is also applicable to a word "second".

A person of ordinary skill in the art may understand that all or a part of the steps of the method in the foregoing embodiments may be implemented by a program instructing relevant hardware. The program may be stored in a computer readable storage medium. The steps of the method in the foregoing the embodiments are performed when the program runs. The storage medium may be at least one of the media that are capable of storing program code, such as a read-only memory (ROM), a RAM, a magnetic disk, or an optical disc.

It should be noted that the embodiments in this application are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly. For related parts, reference may be made to partial descriptions in the method embodiment. The described device and system embodiments are merely examples. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present application without creative efforts.

The foregoing descriptions are merely embodiments of the present application, but are not intended to limit the protection scope of the present application. It should be noted that a person of ordinary skill in the art may make certain improvements and polishing without departing from the principle of the present application and the improvements and polishing shall fall within the protection scope of the present application.

What is claimed is:

1. A packet forwarding method, comprising:
   receiving, by a first scheduler, a target packet, wherein the target packet comprises a packet length;
   sending, by the first scheduler according to egress port information corresponding to the target packet, the target packet to a destination physical egress port corresponding to the egress port information;
   increasing, by the first scheduler according to a queue identifier of a queue in which the target packet is located, a queue length of a virtual queue corresponding to the queue identifier by the packet length;
   determining a total amount of needed bandwidth according to the queue length, wherein the total amount of needed bandwidth represents bandwidth required by the first scheduler to send a packet having the queue identifier;
   sending, by the first scheduler, update information to a port controller after the first scheduler sends the target packet to the destination physical egress port corresponding to the egress port information, wherein the update information comprises that the queue length of the virtual queue is increased by the packet length; and
   decreasing, by the first scheduler, the queue length of the virtual queue by the packet length according to the bandwidth scheduling result corresponding to the update information from the port controller.

2. The packet forwarding method of claim 1, further comprising pre-establishing, by the port controller, an association relationship between the egress port information of the destination physical egress port and a timeslot, wherein the port controller is coupled to the destination physical egress port.

3. The packet forwarding method of claim 2, further comprising:
   obtaining, by the port controller, the target packet from the first scheduler;
   determining, by the port controller according to the queue identifier and the packet length of the target packet, a destination timeslot for outputting the target packet; and
   adding, by the port controller, the target packet to a packet queue corresponding to the destination timeslot.

4. The packet forwarding method of claim 3, further comprising:
   obtaining, by the port controller, bandwidth scheduled for the destination physical egress port according to the update information, wherein the bandwidth scheduled for the destination physical egress port is bandwidth scheduled by a logical port for the destination physical egress port according to the bandwidth scheduling result, and wherein the logical port corresponds to the destination physical egress port;
   extracting, by the port controller in the destination timeslot, the target packet from the packet queue according to the association relationship and available bandwidth of the destination physical egress port; and
   outputting, by the port controller, the target packet using the destination physical egress port corresponding to the destination timeslot.

5. The packet forwarding method of claim 1, wherein before sending the target packet to the destination physical egress port corresponding to the egress port information, the packet forwarding method further comprises:

determining, by the first scheduler by a discard calculation, whether to discard the target packet; and executing, by the first scheduler, sending the target packet to the destination physical egress port corresponding to the egress port information when a determining result is to skip discarding the target packet.

6. A first scheduler comprising:

a memory storing instructions; and a processor coupled to the memory, wherein the instructions cause the processor to be configured to:

receive a target packet, wherein the target packet comprises a packet length;

send, according to egress port information corresponding to the target packet, the target packet to a destination physical egress port corresponding to the egress port information;

increase, according to a queue identifier of a queue in which the target packet is located, a queue length of a virtual queue corresponding to the queue identifier by the packet length;

determine a total amount of needed bandwidth according to the queue length, wherein the total amount of needed bandwidth represents a bandwidth required by the first scheduler to send a packet having the queue identifier;

send update information to a port controller after the target packet is sent to the destination physical egress port corresponding to the egress port information, wherein the update information comprises that the queue length of the virtual queue is increased by the packet length;

receive a bandwidth scheduling result from the port controller, wherein the bandwidth scheduling result is a bandwidth scheduling result generated by the port controller according to the update information; and decrease the queue length of the virtual queue by the packet length according to a bandwidth scheduling result corresponding to the update information from the port controller.

7. The first scheduler of claim 6, wherein the port controller is further configured to pre-establish an association relationship between the egress port information of the destination physical egress port and a timeslot.

8. The first scheduler of claim 7, wherein the port controller is further configured to:

obtain the target packet from the first scheduler;

determine, according to the queue identifier and the packet length of the target packet, a destination timeslot for outputting the target packet; and add the target packet to a packet queue corresponding to the destination timeslot.

9. The first scheduler of claim 8, wherein the port controller is further configured to:

obtain bandwidth scheduled for the destination physical egress port according to the update information, wherein the bandwidth scheduled for the destination physical egress port is bandwidth scheduled by a logical port for the destination physical egress port according to the bandwidth scheduling result, and wherein the logical port corresponds to the destination physical egress port;

extract, in the destination timeslot, the target packet from the packet queue according to the association relationship and available bandwidth of the destination physical egress port; and output the target packet using the destination physical egress port corresponding to the destination timeslot.

10. The first scheduler of claim 6, wherein before sending the target packet to the destination physical egress port corresponding to the egress port information is triggered, the instructions further cause the processor to be configured to determine, by a discard calculation, whether to discard the target packet, and wherein sending the target packet to the destination physical egress port corresponding to the egress port information is triggered when a determining result is to skip discarding the target packet.

11. A computer program product comprising a non-transitory computer readable medium storing program code thereon for packet forwarding, the program code comprising instructions for executing a method that comprises:

receiving, by a first scheduler, a target packet, wherein the target packet comprises a packet length;

sending, by the first scheduler according to egress port information corresponding to the target packet, the target packet to a destination physical egress port corresponding to the egress port information;

increasing, by the first scheduler, according to a queue identifier of a queue in which the target packet is located, a queue length of a virtual queue corresponding to the queue identifier by the packet;

determining a total amount of needed bandwidth according to the queue length, wherein the total amount of needed bandwidth represents a bandwidth required by the first scheduler to send a packet having the queue identifier;

sending, by the first scheduler, update information to a port controller after the first scheduler sends the target packet to the destination physical egress port corresponding to the egress port information, wherein the update information comprises that the queue length of the virtual queue is increased by the packet length;

receiving, by the first scheduler, a bandwidth scheduling result from the port controller, wherein the bandwidth scheduling result is a bandwidth scheduling result generated by the port controller according to the update information; and decreasing, by the first scheduler, the queue length of the virtual queue by the packet length according to the bandwidth scheduling result corresponding to the update information from the port controller.

12. The computer program product of claim 11, wherein the method further comprises pre-establishing, by the port controller, an association relationship between the egress port information of the destination physical egress port and a timeslot, wherein the port controller is connected to the destination physical egress port.

13. The computer program product of claim 12, wherein the method further comprises:

obtaining, by the port controller, the target packet from the first scheduler, determining, by the port controller according to the queue identifier and the packet length of the target packet, a destination timeslot for outputting the target packet; and adding, by the port controller, the target packet to a packet queue corresponding to the destination timeslot.

14. The computer program product of claim 13, wherein the method further comprises:

obtaining, by the port controller, bandwidth scheduled for the destination physical egress port according to the update information, wherein the bandwidth scheduled for the destination physical egress port is bandwidth scheduled by a logical port for the destination physical egress port according to the bandwidth scheduling result, and wherein the logical port corresponds to the destination physical egress port;

extracting, by the port controller in the destination timeslot, the target packet from the packet queue according to the association relationship and available bandwidth of the destination physical egress port; and outputting, by the port controller, the target packet using the destination physical egress port corresponding to the destination timeslot.

15. The computer program product of claim 11, wherein before sending the target packet to the destination physical egress port corresponding to the egress port information, the method further comprises:

determining, by the first scheduler by a discard calculation, whether to discard the target packet; and executing, by the first scheduler, sending the target packet to the destination physical egress port corresponding to the egress port information when a determining result is to skip discarding the target packet.

16. The packet forwarding method of claim 1, wherein the target packet is a packet located in a queue head of the queue, and wherein back pressure occurs in the destination physical egress port.

17. The packet forwarding apparatus of claim 6, wherein the target packet is a packet located in a queue head of the queue, and wherein back pressure occurs in the destination physical egress port.

18. The computer program product of claim 11, wherein the target packet is a packet located in a queue head of the queue, and wherein back pressure occurs in the destination physical egress port.

* * * * *

UNITED STATES PATENT AND TRADEMARK OFFICE
CERTIFICATE OF CORRECTION

PATENT NO. : 10,298,495 B2  
APPLICATION NO. : 15/639748  
DATED : May 21, 2019  
INVENTOR(S) : Cheng Tang Page 1 of 1

It is certified that error appears in the above-identified patent and that said Letters Patent is hereby corrected as shown below:

In the Claims

Column 16, Line 29, should read:  
ing to the queue identifier by the packet length;

Column 18, Line 11, should read:  
17. The first scheduler of claim 6, wherein

Signed and Sealed this  
Twenty-third Day of July, 2019

Andrei Iancu  
*Director of the United States Patent and Trademark Office*